(12) United States Patent  
Lawrence

(10) Patent No.: US 8,311,933 B2
(45) Date of Patent: Nov. 13, 2012

(54) HEDGE FUND RISK MANAGEMENT

(75) Inventor: David Lawrence, New York, NY (US)

(73) Assignee: Goldman, Sachs & Co., New York, NY (US)

( * ) Notice: Subject to any disclaimer, the term of this patent is extended or adjusted under 35 U.S.C. 154(b) by 0 days.

(21) Appl. No.: 13/276,629

(22) Filed: Oct. 19, 2011

(65) Prior Publication Data

US 2012/0036056 A1 Feb. 9, 2012

Related U.S. Application Data

(63) Continuation of application No. 10/464,168, filed on Jun. 17, 2003, now Pat. No. 8,069,105, which is a continuation-in-part of application No. 09/812,627, filed on Mar. 20, 2001, now Pat. No. 8,140,415, and a continuation-in-part of application No. 10/021,124, filed on Oct. 30, 2001, now abandoned, and a continuation-in-part of application No. 10/074,584, filed on Feb. 12, 2002, now abandoned.

(60) Provisional application No. 60/390,296, filed on Jun. 20, 2002.

(51) Int. Cl.
*G06Q 40/00* (2006.01)
(52) U.S. Cl. .......................... 705/37; 705/35; 705/36 R
(58) Field of Classification Search .................... 705/35, 705/36 R, 37
See application file for complete search history.

(56) References Cited

U.S. PATENT DOCUMENTS

| | | | | |
|---|---|---|---|---|
| 5,991,743 A * | 11/1999 | Irving et al. | ................ | 705/36 R |
| 6,119,103 A * | 9/2000 | Basch et al. | .................... | 705/35 |
| 6,598,028 B1 * | 7/2003 | Sullivan et al. | ............ | 705/36 R |
| 7,006,992 B1 * | 2/2006 | Packwood | ....................... | 705/38 |
| 2001/0037275 A1 * | 11/2001 | Johnson et al. | ................ | 705/36 |
| 2002/0099651 A1 * | 7/2002 | May | ................................ | 705/38 |
| 2002/0128939 A1 * | 9/2002 | Tarrant | ............................ | 705/35 |
| 2002/0128952 A1 * | 9/2002 | Melkomian et al. | ............ | 705/37 |
| 2003/0069821 A1 * | 4/2003 | Williams | ........................ | 705/36 |
| 2007/0038544 A1 * | 2/2007 | Snow et al. | ................. | 705/36 R |

* cited by examiner

*Primary Examiner* — Shahid Merchant
*Assistant Examiner* — Kevin Poe
(74) *Attorney, Agent, or Firm* — Perkins Coie LLP

(57) ABSTRACT

A computerized method and system for managing risk associated with a Hedge Fund is disclosed. Information relating to Hedge Funds is gathered and stored as data in preparation for a risk inquiry search relating to a Hedge Fund. Documents and sources of information can also be stored. A subscriber, such as a Financial Institution, can submit a Hedge Fund descriptor for which a risk inquiry search can be performed. The risk assessment or inquiry search can include data retrieved resultant to augmented retrieval methods. Scrubbed data as well as augmented data can be transmitted from a risk management clearinghouse to a subscriber or to a proprietary risk system utilized by a subscriber, such as a risk management system maintained in-house. Risk inquiry searches can be automated and made a part of standard operating procedure for any transaction conducted by the subscriber in which a Hedge Fund is involved.

31 Claims, 5 Drawing Sheets

HEDGE FUND RISK MANAGEMENT

CROSS REFERENCE TO RELATED APPLICATIONS

This application is a continuation of and claims priority under 35 U.S.C. §120 to prior U.S. patent application entitled "Hedge fund risk management", filed Jun. 17, 2003, and bearing the Ser. No. 10/464,168, which claims the benefit of the filing date of U.S. Provisional application No. 60/390,296 entitled "Hedge Fund Risk Management", filed Jun. 20, 2002, and which is a continuation-in-part of a prior application entitled "Risk Management Clearinghouse", filed Feb. 12, 2002, and bearing the Ser. No. 10/074,584, which is a continuation-in-part of a prior application also entitled "Risk Management Clearinghouse" filed Oct. 30, 2001, and bearing the Ser. No. 10/021,124, which is also a continuation-in-part of a prior application entitled "Automated Global Risk Management" filed Mar. 20, 2001, and bearing the Ser. No. 09/812,627. The entirety of the aforementioned applications are expressly incorporated herein by reference.

BACKGROUND

This invention relates generally to a method and system for facilitating the identification, investigation, assessment and management of legal, regulatory financial, market, credit, operations and reputational risks ("Risks"). In particular, the present invention relates to a computerized system and method for banks and non-bank financial institutions to access information compiled on a worldwide basis and relate such information to a Hedge Fund, wherein the information is conducive to quantifying and managing Risks associated with the hedge fund.

Although the term "hedge fund" may not be strictly defined by government statute, over time, the term generally refers to a variety of pooled investment vehicles that are not registered under the federal securities laws as public corporations, investment companies, or broker-dealers.

As money-laundering and related concerns have become increasingly important public policy concerns, regulators have attempted to address these issues by imposing increasing formal and informal obligations upon financial institutions, including hedge funds. Government regulations authorize a broad regime of record-keeping and regulatory reporting obligations on covered financial institutions as a tool for the federal government to use to fight drug trafficking, money laundering, and other crimes. The regulations may require financial institutions to file currency and monetary instrument reports and to maintain certain records for possible use in tax, criminal and regulatory proceedings. Such a body of regulation is designed chiefly to assist law enforcement authorities in detecting when criminals are using banks and other financial institutions as intermediaries for, or to hide the transfer of funds derived from, criminal activity.

Obligations include those imposed by the Department of the Treasury and the federal banking regulators which adopted suspicious activity report ("SAR") regulations. These SAR regulations require that financial institutions file SARs whenever an institution detects a known or suspected violation of federal law, or a suspicious transaction related to a money laundering activity or a violation of the Bank Secrecy Act (BSA). The regulations can impose a variety of reporting obligations on financial institutions.

Perhaps most broadly relevant for the present invention, current regulations require an institution to report transactions aggregating to $5,000 that involve potential money laundering or violations if the institution, knows, suspects, or has reason to suspect that the transaction involves funds from illegal activities, is designed to disguise such funds, has no business or legitimate purpose, or is simply not the sort of transaction in which the particular customer would normally be expected to engage, and the institution knows of no reasonable explanation for the transaction after examining the available facts.

Federal regulators have made clear that the practical effect of these requirements is that financial institutions are subject to significant obligations to "know" their customer and to engage in adequate monitoring of transactions.

The Securities and Exchange Commission (SEC) typically will receive limited information regarding the activities of various large market participants, including some hedge funds, through reports that are filed when they acquire 5% or more of a class of security issued by a publicly traded company. The SEC will also receive limited information about hedge funds through reports filed by managers exercising investment discretion over accounts having $100 million or more in equity securities. This information, however, does not reveal much detail about the trading activities of Hedge Funds and other large participants in our markets. In addition, the limited partnership structure of a hedge fund can make it more difficult to ascertain who the ultimate "customer" of a financial institution is.

Risk associated with a transaction involving a hedge fund can be increased due to the difficulty in gathering and accessing pertinent data on a basis timely to managing risk associated with the transaction. As part of due diligence associated with performing financial, it is imperative for a financial institution to "Know Their Customer" including whether a customer is contained on a list of restricted entities published by the Office of Foreign Access Control (OFAC), the Treasury Office or other government or industry organization. The amount of information that needs to be considered to evaluate whether an entity poses a significant risk or should otherwise be restricted, is substantial.

What is needed is a method and system to draw upon information gathered globally that relates to hedge funds and the partners associated with a fund. The information can be utilized to assist with risk management and due diligence related to a financial transaction involving a hedge fund. A new method and system should anticipate scrubbing data from multiple sources in order to facilitate merging data from all necessary sources. In addition, data mining should be made available to ascertain patterns or anomalies in the query results. Risk information should also be situated to be conveyed to a compliance department and be able to demonstrate to regulators that a financial institution has met standards relating to risk containment.

SUMMARY

Accordingly, the present invention provides a method for managing risk associated with Hedge Funds. In particular, the present invention includes gathering data relevant to Hedge Funds from multiple sources and aggregating the data gathered according to risk variables. An inquiry relating to a Hedge Fund can be received and portions of the aggregated data can be associated with risk variables related to the Hedge Fund. A risk variable can include, for example, a sponsor of a Hedge Fund, investments made by the Hedge Fund, partners involved in the Hedge Fund, a domicile of the Hedge Fund, a chief place of operation of the Hedge Fund, whether the Hedge Fund is available to U.S. citizens, or other factors. The associated portions of the aggregated data can then be transmitted, such as for example, to a subscriber or a risk management clearinghouse.

In some embodiments, data can be gathered exclusively from publicly available sources. An inquiry can be related, for example, to: a sponsor of the Hedge Fund; a partner of a Hedge Fund; a domicile of the Hedge Fund; investments made by the Hedge Fund; a commodity pool operator as defined in the Commodity Exchange Act; hedge Fund window dressing; Hedge Fund portfolio pumping; a lockup provision; an alert list; or other risk subject or risk subject variable.

Embodiments can also include conditioning transmission of associated portions of the aggregated data upon receipt of a contractual obligation, such as, for example, contractual obligation not to use the associated portions of the aggregated data for any purpose covered by the Fair Credit Reporting Act or for contractual obligation.

Similarly, embodiments can include transmitting associated portions of the aggregated data in response to specified conditions being met, such as, for example: transmitting exclusively to an institution, such that the transmitter will have neither customers nor consumers as defined in the Gramm-Leach—Bliley Act; limiting use of the aggregated data for complying with regulatory and legal obligations associated with at least one of: (i) the detection and prevention of money laundering, (ii) fraud, (iii) corrupt practices, (iv) organized crime, and (v) activities subject to government sanctions or embargoes; transmitting the associated portions of the aggregated data conditioned upon receipt of a contractual obligation to limit use of the aggregated data for at least one of: (i) the prevention or detection of a crime, (ii) the apprehension or prosecution of offenders, and (iii) the assessment or collection of a tax or duty; or other condition. In addition, some embodiments can include gathered data relevant to a Hedge Fund which accurately reports on or consists of a governmental record or of insures that the source of gathered data is reputable.

In another aspect, the aggregated data can be continually monitored and any new information related the Hedge Fund transmitted to a predetermined destination.

Other aspects can include gathering data relevant to a Hedge Fund from multiple sources and aggregating the data gathered according to risk variables. An inquiry relating to the Hedge Fund can be received associating portions of the aggregated data with the Hedge Fund and transmitting the portions of the aggregated data associated with the Hedge Fund according to the inquiry. Embodiments can also include enhancing and/or scrubbing the data, such as, for example, incorporating changes in the spelling of datum or utilizing an index file. Similarly, some embodiments can include augmenting associated portions of aggregated data, such as through data mining.

Associating aggregated data can include, for example: using Boolean logic or relevance ranking.

Some embodiments can include receiving a source of gathered data and transmitting the source of the associated portions of aggregated data along with other search results.

Other embodiments of the present invention can include a computerized system, executable software, or a data signal implementing the inventive methods of the present invention. The computer server can be accessed via a network access device, such as a computer. Similarly, the data signal can be operative with a computing device, and computer code can be embodied on a computer readable medium.

In another aspect, the present invention can include a method and system for a user to interact with a network access device so as to manage risk relating to a risk subject. The user can initiate interaction with a proprietary risk management server via a communications network and input information relating to details of the risk subject, such as, for example, via a graphical user interface, and receive back information related to the risk subject.

Various features and embodiments are further described in the following figures, drawings and claims.

DETAILED DESCRIPTION

Figure 1:
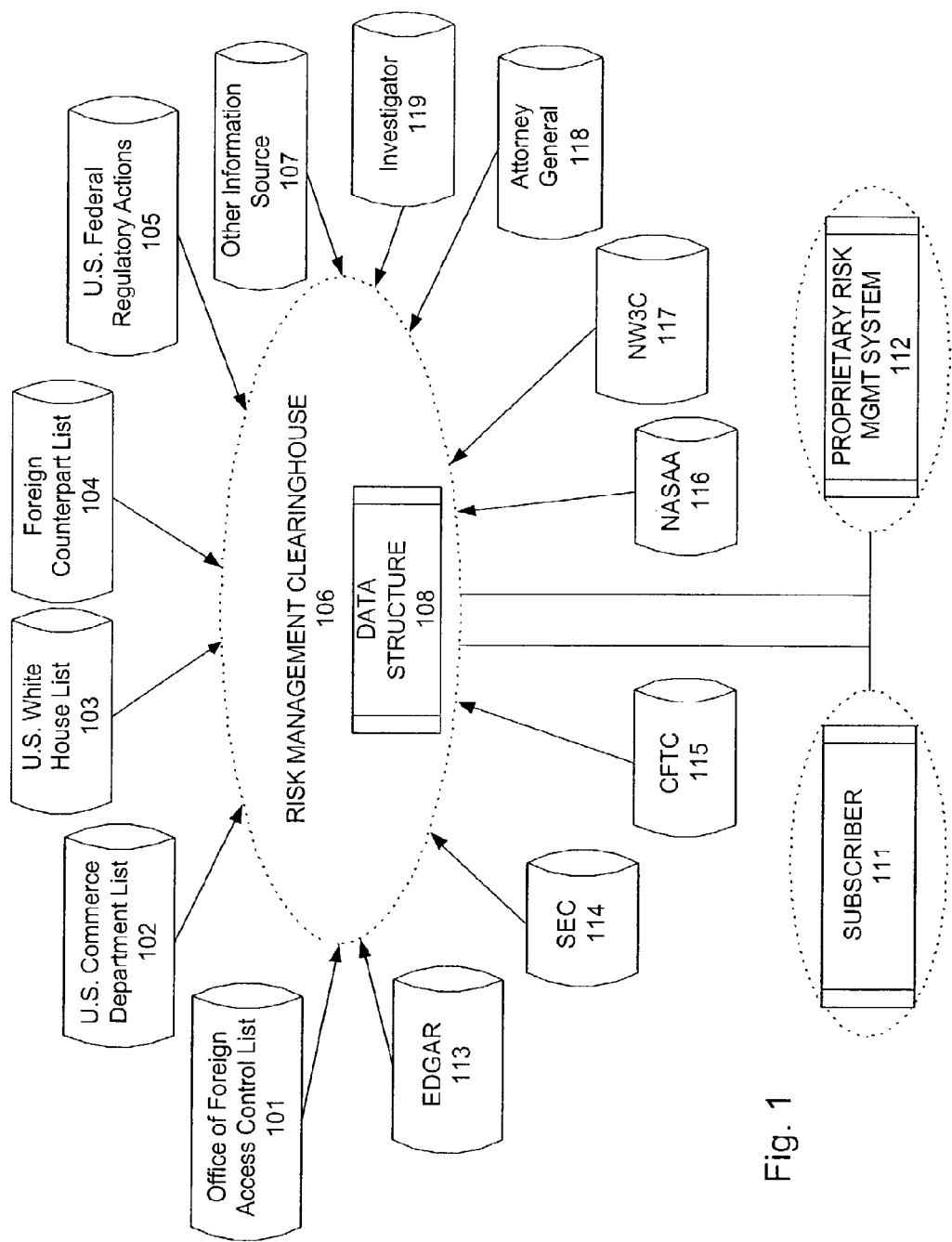
FIG. 1 illustrates a block diagram that can embody this invention.

The present invention includes a computerized method and system for managing risk associated with a Hedge Fund. The computerized system gathers and stores information as data in a database, or other data storing structure, and processes the data in preparation for a risk inquiry search relating to a Hedge Fund. An inquiry will relate to a Risk Variable, such as, for example, a principal of the Hedge Fund. Documents and sources of information can also be stored and retrieved via the inquiry. A subscriber, such as a Financial Institution, can submit a Hedge Fund descriptor for which a risk inquiry search can be performed. A risk assessment or inquiry search is performed relating to the descriptor and can include data retrieved resultant to augmented retrieval methods. Scrubbed data as well as augmented data can be transmitted from a risk management clearinghouse (RMC) to a subscriber or to a proprietary risk system utilized by a subscriber, such as a risk management system maintained in-house. In some embodiments, a Risk inquiry search can be automated and made a part of standard operating procedure for any transaction conducted by the subscriber in which a Hedge Fund is involved.

DEFINITIONS

Financial Institution: Financial Institution refers to any person, entity, company, corporation or statutory "person" in the business of providing Financial Transactions. As such, as used herein, a Financial Institution can collectively and individually include: Bank and non-bank financial institutions, including: investment banks; merchant banks; commercial banks; securities firms, including broker dealers securities and commodities trading firms; asset management companies, other hedge funds, mutual funds, credit rating funds, securities exchanges and bourses, institutional and individual investors, law firms, accounting firms, auditing firms, any institution the business of which is engaging in financial activities as described in section 4(k) of the Bank Holding Act of 1956, and other entities subject to legal and regulatory compliance obligations with respect to money laundering, fraud, corruption, terrorism, organized crime, regulatory and suspicious activity reporting, sanctions, embargoes and other regulatory risks and associated obligations.

Financial Transaction: a Financial transaction refers to any action that anticipates a transfer of money from a first set of one or more Transaction Participants to a second set of one or more Transaction Participants. Examples of Financial Transactions can include: investment and merchant banking, public and private financing, commodities and a securities trading, commercial and consumer lending, asset management, rating of corporations and securities, public and private equity investment, public and private fixed income investment, listing to companies on a securities exchange and bourse, employee screening, auditing of corporate or other entities, legal opinions relating to a corporate or other entity, or other business related transactions.

Hedge Fund: As used herein, a Hedge Fund will include limited partnerships, including foreign limited partnerships or other vehicle to provide pass-through tax treatment of investor earnings. When organized abroad, Hedge Funds are usually structured to avoid U.S. taxation of the earnings of foreign investors. A U.S. Hedge Fund will include a private limited partnership. Often a U.S. Hedge Fund will have 99 or fewer limited partners.

To maximize flexibility, Hedge Funds operating in the U.S. may be structured so that the fund will be exempt from regulation under the Investment Company Act of 1940. A Hedge Fund may also rely on the trader exception from broker-dealer registration. In addition, interests in Hedge Funds can be and typically are, sold privately to sophisticated, high net worth individuals to avoid registration of the interests under the Securities Act of 1933, other traditional customers of Hedge Funds can include institutions, endowments and foundations.

Like other market participants, such as securities firms, banks, and insurance companies, Hedge Funds can vary widely in size, trading strategies, degrees of leverage, and market influence. An active Hedge Fund may trade a broad range of financial products, including equities, U.S. and foreign government securities, commodities, financial futures, options, foreign currencies, and derivatives. A Hedge Fund may also participate in merger and acquisition investments and various forms of direct investment activity around the internationally.

Hedge Fund Sponsor: A sponsor of a Hedge Fund is a person responsible for managing the investments of the Hedge Fund. The limited partners' investments are pooled and managed by a general partner or sponsor that is also typically an investor. A sponsor may be registered as an investment adviser under the federal securities laws, but is not so required. As compensation, a sponsor will typically receive a management or administrative fee based on the amount of a fund's assets, together with an allocation based on the fund's investment performance, such as a share of profits. Typically, the sponsor does not share responsibility to any losses incurred by the fund.

Informational Artifact: Informational Artifact refers to a media item that contains information that can be interpreted into a humanly ascertainable form. Examples of Informational Artifacts include: a news article, a news feed portion, a video segment, a newscast, a report, an identifiable document, an agency listing, a list, a government publication, other identifiable publication, a sound byte, a sound recording, or other media item.

Risks: Risks associated with a financial transaction can include factors associated with security risk, financial risk, legal risk, regulatory risk and reputational risk. A Security Risk refers to breach of a safety measure that may result in unauthorized access to a facility; unauthorized access to data; physical harm, including threat of immediate risk of harm to a person or goods. Financial Risk refers to factors indicative of monetary costs that the Risk Bearing Institution or a Transaction Participant may be exposed to as a result of a particular Financial Transaction. Monetary costs can be related to fines, forfeitures, costs to defend an adverse position, lost revenue, or other related potential sources of expense. Regulatory Risk refers to factors that may cause the Risk Bearing Institution or Transaction Participant to be in violation of rules put forth by a government entity or regulatory agency. Reputational risk relates to harm that a Risk Bearing Institution or Transaction Participant may suffer regarding its professional standing in an industry or the public eye. A Risk Bearing Institution and Transaction Participant can suffer from being associated with a situation that may be interpreted as contrary to an image of diligence, honesty and forthrightness.

Risks may be related to the duty to disclose material information, to report and possibly prevent: fraud, money laundering, foreign corrupt practices, bribery, embargoes and sanctions. Timely access to relevant data on which to base a regulatory or reputational Risk related action can be critical to conducting business and comply with regulatory requirements such as those set forth by the Patriot Act in the United States.

Risk Management Clearinghouse (RMC): RMC refers to computerized systems and methods for managing Risks and associating information and/or informational artifacts useful for quantifying Risk with a Risk subject, as more fully described in the related patent applications: Ser. No. 10/074, 584 entitled "Risk Management Clearinghouse" filed Feb. 12, 2002, and U.S. patent application Ser. No. 10/021,124 entitled "Risk Management Clearinghouse" filed Oct. 30, 2001.

Risk Quotient: Risk Quotient refers to a quantitative value of an amount of Risk, a Risk Quotient can be based upon a weighted algorithm applied to the Risk criteria and informational artifacts.

Subscriber: Subscriber refers to any person or entity authorized to access an RMC system 106.

Transaction Participant: Transaction Participant refers to a person who will partake in a Financial transaction.

Referring now to FIG. 1 a block diagram of some embodiments of the present invention is illustrated. An RMC system 106 gathers and receives information which may be related to risk variables in a Hedge Fund. Information may be received, for example, from publicly available or private sources, including, for example: the Office of Foreign Access Control (OFAC) 101, the U.S. Commerce Department List 102, the U.S. White House List 103, a Foreign Counterpart list 104, a List of U.S. Federal Regulatory Actions 105, EDGAR 113, the SEC 114, Commodities Futures Trading Corp. (CTFC) 115, North American Securities Administrators Association (NASAA) 116, National White Collar Crime Center (NW3C) 116, a state or federal attorney general's office 117, a subscriber 111, investigation entity 119, or other source, such as a foreign government, U.S. adverse business-related media reports, U.S. state regulatory enforcement actions, international regulatory enforcement actions, international adverse business-related media reports, a list of politically connected individuals and military leaders, list of U.S. and international organized crime members and affiliates, a list put forth by the Financial Action Task Force (FATF), a list of recognized high risk countries, or other source of high risk variables. Court records or other references relating to fraud, bankruptcy, professional reprimand or a rescission of a right to practice, suspension from professional ranks, disbarment, prison records or other source of suspect behavior can also be an important source of information.

The information received can be constantly updated and can be related to a Hedge Fund or an alert list related to a Hedge Fund, in order to facilitate risk management and/or compliance with regulatory requirements. The RMC system 106 can facilitate due diligence on the part of a subscriber 111 by gathering, structuring and providing to the subscriber 111 data that relates to risk variables involved in a Hedge Fund.

A risk variable can include any datum associated with a specified Hedge Fund that can cause a risk level relating to the specified Hedge Fund to change. A Financial Institution may have an obligation to relate such variables to suspicious activity and also to know their customers. An RMC system 106 can compare and relate received information associated with a Hedge Fund with information from government sources, and the like, identifying high risk individuals, entities or organizations.

For example, a Financial Institution may request information on a Hedge Fund that has requested that the Financial Institution execute a particular transaction. The Financial Institution may submit an inquiry requesting information related to risk variables such as, who is associated with the Hedge Fund, the source of the Hedge Fund's investment, the Hedge Fund's manager or other related information. In addition, the Financial Institution may need to know if any of the parties or jurisdictions associated with the Hedge Fund is included on any list issued by the government relating to high risk activity. It may also be useful to ascertain whether a fund manager is a commodity pool operator. A commodity pool operator as defined by the Commodity Exchange Act can include a person engaged in the business of soliciting or accepting funds from others for the purpose of trading commodity futures contracts in connection with a commodity pool.

Other risk variables can include, for exemplary purposes, a sovereign state involved, a geographic area, a shell bank, a correspondent account, a political figure, a person close to a political figure, a history of fraud, embargoes, sanctions, or other factors, such as a beneficiary of a partner in the Hedge Fund. Additional variables can include statements relating to Net Asset Value (NAV) that may be issued monthly or quarterly. The RMC system 106 may track statements of the NAV for a fund and highlight anomalies or trends, or sudden increases or decreases in value. It may also be useful to ascertain how heavily leveraged a Hedge Fund may be, as well as whether an amount of leverage is typical for particular Hedge Fund or shows a trend of increasing leverage or decreasing leverage. Typically, a Hedge Fund can require a substantial time commitment for funds invested in the fund, such as from 1 to 5 years, this type of commitment can be conducive to a static partnership which in turn can facilitate efforts to gather information related to the fund.

Hedge funds are inherently private investment vehicles and therefore it is sometimes difficult to obtain information on a level of detail that is equivalent to the amount of information that is available relating to traditional institutions. However, if it is available, other information that may be important relating to risk associated with a Hedge Fund can include the types of investments made by the Hedge Fund, as well as whether there is a change in the types of investments made by the Hedge Fund.

For example, a Hedge Fund may be involved in portfolio pumping which can include the practice of increasing a fund's stake in portfolio securities at the end of a financial period solely for the purpose of fraudulently driving up the NAV of the fund. An investment manager may, for example, manipulate the value of common stocks of an over the counter bulletin board company in which the Hedge Fund held an interest at the end of each month for a period of time. The investment manager can cause fund redemptions to be made at inflated values for the manager's benefit and to the detriment of a Hedge Fund's other investors.

Another practice that a RMC system 106 can attempt to provide information on can include "window dressing". With window dressing, a fund manager or advisor can buy or sell portfolio securities at the end of a reporting period for the purpose of misleading investors as to the securities held by an associated Hedge Fund, and/or the strategies engaged in by the advisers or the source of the fund's performance. For example, an advisor may cause a Hedge Fund to hold significant positions in securities that are not permitted under the Hedge Fund's disclosed investment objectives. As a reporting period draws near, the adviser liquidates these positions to come into compliance with its stated objectives. Investors can be misled if they are told that the fund is investing consistent with prospectus disclosure when it is not.

Window dressing may also occur when an adviser replaces investments in otherwise permissible securities with investments in high performers just before the end of a reporting period to make it appear as though the adviser had a winning hand.

Some embodiments can include a RMC system 106 performing a certification that a risk inquiry has been conducted relating to all known related parties and other risk factors. Inquiry criteria can be listed for the perusal and records of a subscriber interested. A certification can include transmitting to a subscriber any related informational data, informational artifacts or other materials discovered as a result of the inquiry. Embodiments can also include transmitting informational data and artifacts relating to a Hedge Fund risk inquiry without associating the informational data or artifacts with a risk quotient or any other value judgment or other rating. As such, still other embodiments can include a risk quotient, value judgement or other rating to provide a subjective quantification of the amount of risk involved in dealing with a subject Hedge Fund.

In some embodiments, and for example, if permissible under prevailing law, a subscriber can input or otherwise provide to an RMC system 106 information relating to a Hedge Fund. Provider supplied information can include information gathered according to normal course of dealings with a particular hedger fund or discovered via investigation. In addition, in accordance with prevailing law, a financial institution may discover or suspect that a person or entity related to a Hedge Fund is involved in some fraudulent or otherwise illegal activity and report this information to the RMC system 106, as well as an appropriate authority.

A decision by a financial institution concerning whether to pursue a transaction involving a Hedge Fund can be dependent upon many risk variables. A multitude and diversity of risks related to the variables may need to be identified and evaluated. In addition, the weight and commercial implications of each variable and associated Risks can be interrelated.

Information gathered from the diversity of data sources can be aggregated into a searchable data storage structure 108. A source of information can also be received and stored. In some instances a subscriber 111 may wish to receive information regarding the source of information received. Gathering data into an aggregate data structure 108, such as a data warehouse allows a RMC system 106 to have the data 108 readily available for processing a risk management search associated with a risk subject. Aggregated data 108 can also be scrubbed or otherwise enhanced.

In some embodiments involving enhancing data, data scrubbing can be utilized to implement a data warehouse comprising the aggregate data structure 108. Data scrubbing can take information from multiple databases or other sources and store it in a manner that provides efficient access to key portions. Scrubbing can facilitate expedient access to accurate data commensurate with the critical business decisions that will be based upon the risk management assessment provided.

Various data scrubbing routines can be utilized to facilitate aggregation of risk variable related information. The routines can include programs capable of correcting a specific type of mistake, such as an incomprehensible address, or clean up a full spectrum of commonly found database flaws, such as field alignment that can pick up misplaced data and move it to a correct field or removing inconsistencies and inaccuracies from like data. Other scrubbing routines can be directed directly towards specific legal issues, such as money laundering or terrorist tracking activities.

For example, a scrubbing routine can be used to facilitate various different spellings of a word or phrase. In particular, spelling of names can be important when names have been translated from a foreign language into English. For example, some languages and alphabets, such as Arabic, may have no vowels. Translations from Arabic to English can be very important for financial institutions seeking to be in compliance with lists supplied by the U.S. government that relate to terrorist activity and/or money laundering. A data scrubbing routine can facilitate risk variable searching for multiple spellings of an equivalent name or other important information. Such a routine can enhance the value of aggregate data gathered and also help correct database flaws. Scrubbing routines can improve and expand data quality more efficiently than manual mending and also allow a subscriber 111 to quantify best practices for regulatory purposes.

Retrieving information related to risk variables from aggregated data is an operation with the goal to fulfill a given a request. In order to process a request against a large document set of aggregated risk data with a response time acceptable to the user, it may be necessary to utilize an index based approach to facilitate acceptable response times. A direct string comparison based search may be unsuitable for the task.

An index file for a collection of documents can therefore be built upon receipt of the new data and prior to a query or other request. The index file can include a pointer to a document and also include important information contained in documents the index points to. At query time, the RMC system 106 can match the query against a representation of the documents, instead of the documents themselves. The RMC system 106 can retrieve the documents referenced by the indexes that satisfy the request if the subscriber submits such a request. However it may not be necessary to retrieve the full document as index records may also contain the relevant information gleaned from the documents they point to. Efficiency can be increased as the user is allowed to extract information of interest without having to read the source document.

At least two exemplary retrieval models can be utilized in fulfilling a search request. One retrieval model can include Boolean retrieval in which a document set is partitioned in two disjoint parts with one fulfilling a query and one not fulfilling it. A second retrieval model can include relevance ranking in which all the documents are considered relevant to a certain degree. Boolean logic models use exact matching, while relevance ranking models use fuzzy logic, vector space techniques, such as a technique wherein documents and the query are considered vectors in a multidimensional space, a shorter distance between a document vector and the query vector indicates increased relevance for the document, neural networks, and probabilistic schema.

Augmenting data can include data mining techniques that use software to analyze and sift through the aggregated data stored in the warehouse utilizing techniques such as mathematical modeling, statistical analysis, pattern recognition, rule based trends or other data analysis tools. In contrast to traditional systems that may have gathered and stored information in a flat file and regurgitated the stored information when requested, such as in a defined report related to a specific risk subject or other ad hoc access concerned with a particular query at hand, the present invention can provide risk related searching that adds a discovery dimension by returning results that human operator would find very labor and cognitively intense.

This discovery dimension supplied by the RMC system 106 can be accomplished through the application of augmenting techniques, such as data mining applied to the risk related data that has been aggregated. Data mining can include the extraction of implicit, previously unknown and potentially useful information from the aggregated data. This type of extraction can include unlooked for correlations, patterns or trends. Other techniques that can be applied can include fuzzy logic and/or inductive reasoning tools.

For example, augmenting routines can include enhancing available data with routines designed to reveal hidden data. Revealing hidden data or adding data fields derived from existing data can be very useful to risk management. For example, supplied data may not include an address for a person involved in a Hedge Fund; however a known telephone number is available. Augmented data can include associating the telephone number with a geographic area. The geographic area may be a political boundary, or coordinates, such as longitude and latitude coordinates, or global positioning coordinates. The geographic area identified can then be related to high risk or low risk areas.

An additional example of augmented data derived from a telephone number can include associating the given telephone number with a high risk entity, such as a person listed on an OFAC list.

In some embodiments, a subscriber 111 can access the RMC system 106 via a computerized system as discussed more fully below. The subscriber can input a description of a Hedge Fund, or other inquiry, such as the name of a party associated with a Hedge Fund. In some instances, in accordance with applicable laws, other identifying information can also be input, such as a date of birth, a place of birth, a social security number or other identifying number, or any other descriptive information. The RMC system 106 can receive the identifying information and perform a risk related inquiry or search on the aggregated data, including, if it is available, any scrubbed data.

In other embodiments, a subscriber 111 can utilize a computerized proprietary risk management (PRM) system 112. The PRM system 112 can receive an electronic feed from a RMC system 106 with updated data, including, if it is available, any scrubbed data. In addition, data mining results can also be transmitted to the PRM system 112 or performed by the PRM system 112 for integration into the risk management practices provided by in-house by the subscriber.

Information entered by a subscriber into a PRM system 112 may be information gathered according to normal course of dealings with a particular entity or as a result of a concerted investigation. In addition, since the PRM system 112 is proprietary and a subscriber responsible for the information contained therein can control access to the information contained therein, the PRM system 112 can include information that is public or proprietary. If desired, information entered into the PRM system 112 can be shared with a RMC system 106. Informational data can be shared, for example via an electronic transmission or transfer of electronic media. However, RMC system data 108 may be subject to applicable local or national law and safeguards should be adhered to in order to avoid violation of such law through data sharing practices. In the event that a subscriber, or other interested party, discovers or suspects that a person or entity is involved in a fraudulent or otherwise illegal activity, the system can report related information to an appropriate authority.

Generally, the functionality of a PRM 112 is equivalent to functionality provided by an RMC system 106, except that data stored in the PRM 112 and access to the RPm 112 can be kept proprietary. For the remainder of this document, any reference to an RMC 106 can be considered to also include a PRM 112 unless otherwise specified.

The RMC system 106 can allow a Financial Institution, or other subscriber, to screen Hedge Fund related entities with various due diligence checks on an efficient basis. An inquiry can be utilized to identify Hedge Funds by principals involved, by investment style, performance, domicile or other criteria. It can also be useful in determining if a Hedge Fund is for U.S. and non-U.S. investors; whether a Hedge Fund is a single manager fund or a fund of funds; details relating to management style and underlying investments; or research details of a fund. Details can also be included relating to fund risk and performance analytics.

A log or other stored history can be created by the RMC system 106 and/or a PRM system 112, such that utilization of the system can mitigate adverse effects relating to a problematic account. Mitigation can be accomplished by demonstrating to regulatory bodies, shareholders, news media and other interested parties that corporate governance is being addressed through tangible risk management processes.

One or more reports can also be generated which are related to one or more risk variables searched by the RMC 106. In various embodiments, the reports can include informational data returned by a risk query, any related informational artifacts, descriptions of informational artifacts, risk quotients or other evaluations or summaries of information resulting from any related RMC searches.

An inquiry can also be automatically generated from monitoring transactions being conducted by a subscriber 111, or taking place with systems under control of a subscriber. For example, an information system can electronically scan transaction data for key words, entity names, geographic locales, or other pertinent data relating to Hedge Funds. Programmable software can be utilized to formulate an inquiry according to a Hedge Fund name, partner name, sponsor name, manager name, beneficiary name or other pertinent data and run the inquiry against a database maintained by the RMC server 210 or in a PRM server 211. Other methods can include voice inquiries via a telephone or other voice line, such as voice over internet, fax, electronic messaging, or other means of communication. An inquiry can also include direct input into a RMC system 106, such as through a graphical user interface (GUI) with input areas or prompts.

An inquiry can also be generated by filling in data in a GUI with fields or prompts. Prompts or other questions proffered by the RMC system 106 can be according to predetermined data fields, or depend from previous information received. Information generally received, or received in response to the questions, can be input into the RMC system 106 from which it can be utilized for real time risk assessment and generation of a risk valuation, such as a risk quotient.

An alert list containing names and/or terms related to a Hedge Fund can also be supplied to the RMC system 106 by a subscriber 111 or other source. Each alert list can be customized and specific to a subscriber 111. The RMC system 106 can continually monitor data in its database via an alert inquiry with key word, fuzzy logic or other search algorithms and transmit related informational data to the interested party. In this manner, ongoing diligence can be conducted. In the event that new information is uncovered by the alert inquiry, the subscriber 111 can be notified. Appropriate action can be taken according to the information uncovered.

The RMC system 106 can quantify risk due diligence by capturing and storing a record of information received which can include, for example, informational data, copies of or a description of any artifacts and a description of any actions taken relating to a Hedge Fund. Once quantified, the due diligence data can be utilized for presentation, as appropriate, to regulatory bodies, shareholders, news media and/or other interested parties, such presentation may be useful to mitigate adverse effects relating to a problematic transaction. The data can demonstrate that corporate governance is being addressed through tangible risk management processes.

In some embodiments, a RMC database 108 can contain only information collected from publicly-available sources relevant for the detection and prevention of money laundering, fraud, corrupt practices, organized crime, activities subject to governmental sanctions or embargoes, or other similar activities that are the subject of national and/or global regulation. A subscriber 111 can use the database to identify the possibility that a risk subject associated with a Hedge Fund may be involved in illegal activities.

A subscriber 111 to the RMC system 106 can access the database electronically and to receive relevant information electronically and, in specific circumstances, hard copy format. If requested, a RMC system 106 provider can alert a subscriber 111 upon its receipt of new RMC system 106 entries concerning a previously screened individual. A subscriber 111 will be permitted to access information in the RMC system 106 in various ways, including, for example: system to system inquires involving single or batch screening requests, individual inquiries (submitted electronically, by facsimile, or by phone) for smaller screening requests, or through a web-based interface supporting an individual look-up service. Generally, employees and vendors will not be permitted to use or share to information about subscriber requests unless such access is necessary to provide a requested product or service or to fulfill legal obligations under prevailing law.

In some embodiments, a RMC system 106 can take any necessary steps so as not to be regulated as a consumer reporting agency. Such steps may include not collecting or permitting others to use information from the RMC database 108 to establish an individual's eligibility for consumer credit or insurance, other business transactions, or for employment or other Fair Credit Reporting Act (FCRA) covered purposes such as eligibility for a government benefit or license.

To satisfy the requirements of embodiments prohibiting use of the RMC 106 for FCRA covered purposes, a subscription agreement can be established between the RMC system 106 provider and a subscriber 111 which will create enforceable contractual provisions prohibiting the use of data from the RMC database 108 for such purposes. The operations of the RMC system 106 can be structured to minimize the risk that the RMC database will be used to furnish consumer reports and therefore become subject to the FCRA.

Some embodiments can therefore include establishment of additional policies and practices to avoid FCRA implications, such as, for example: the information in the RMC database can be collected only from reputable, publicly available sources and not contain information from consumer reports; the RMC system 106 can collect and permit others to use the information only for the purpose of complying with regulatory and legal obligations associated with the detection and prevention of money laundering, fraud, corrupt practices, organized crime, activities subject to governmental sanctions or embargoes, or other illegal activities that are the subject of national and/or global regulation.

The RMC system 106 can forego collection of and refuse to permit others to use information from the database to establish an individual's eligibility for consumer credit or insurance, for employment or for any other use contrary to any other restrictions FCRA may establish. Subscribers can be required to execute a licensing agreement that will limit their use of the data to specified purposes, including, for example, specifically that the subscriber 111 will not use the information to determine a consumer's eligibility for any credit, insurance, other business transaction or for employment or other FCRA-covered purposes. Accordingly, some embodiments can require each subscriber 111 to certify that the subscriber 111 will use the data only for such specified purposes, and to certify annually that the subscriber 111 remains in compliance with its certification that the information is not being used for any of the proscribed purposes.

A licensing agreement that can be utilized with some embodiments can also require that subscribers 111 separately secure information from non-RMC system 106 sources to satisfy any need the subscriber has for information to be used in connection with the subscriber's determination regarding a consumer's eligibility for credit, insurance, other business transactions, or employment or for other FCRA-covered purposes.

In another aspect, in some embodiments of a RMC system 106, a provider can utilize the RMC system 106 to provide services exclusively to other Financial Institutions or business entities, such that the RMC system 106 provider will have neither "customers" nor "consumers" as those terms are defined in the Gramm-Leach—Bliley Act (GLBA) and therefore may have no notice or disclosure obligations under the GLBA. In addition, a subscriber's disclosure of the name of its customer to a RMC system 106 may be permitted for institutional risk control and other purposes under the GLBA. An RMC system 106 provider can be contractually obligated to use customer names received from a subscriber only for the purpose of fulfilling that subscriber's request for information or for another purpose permitted by the GLBA, ensuring that the Act's limits on re-use and re-disclosure are met.

In another embodiment, a RMC system 106 may allow dissemination of database information for purposes including: the prevention or detection of crime; the apprehension or prosecution of offenders; or the assessment or collection of any tax or duty.

In still another aspect, a RMC system 106 can be structured to take advantage of the immunity from liability for libel and slander granted by the Communications Decency Act ("CDA") to providers of interactive computer services. Where its operations are not protected by the CDA, a RMC system 106 may be able to reduce its risk of liability for defamation substantially by relying only upon information and artifacts provided by official government sources and other reputable sources, and taking particular care with defamatory information from unofficial sources. In addition the RMC system 106 provider can take reasonable steps to assure itself of the information's accuracy, including insuring that the source of the information is reputable.

The RMC system 106 can operate an interactive computer service as that term is defined in the CDA. The clearinghouse can therefore provide an information service and/or access software that enables computer access by multiple users to a computer server. In some embodiments, if desired, a RMC system 106 provider can limit its employees or agents from creating or developing any of the content in the RMC database 108. Content be maintained unchanged except that the RMC system 106 can remove information from the database that it determines to be inaccurate or irrelevant.

Still other embodiments can incorporate a transmission of information from the RMC database 108 that will be carefully structured such that the RMC system 106 will not provide "consumer reports" regulated by the FCRA. As such, the data may be limited by not relating to consumers, but rather to corporate entities. Data on consumers can be prevented from identifying them definitively, inasmuch as the individual named in a public record may or may not be the individual who is the subject of a RMC search. Moreover, the RMC system 106 can forego collecting information in order to provide consumer reports, and also not use or have a reasonable basis to expect that subscribers will use, any RMC data 108 for FCRA covered purposes.

For example, in some embodiments, the RMC system 106 can limit collection of data to that information that will be relevant for the detection and prevention of money laundering, fraud, corrupt practices, organized crime, activities subject to governmental sanctions or embargoes, or other similar activity that is the subject of national and/or global regulation. The RMC system 106 can be limited to collecting information for the RMC database 108 solely from publicly-available sources, principally information from news media and information released to the public by government agencies, such as regulatory enforcement action notice and embargo, sanction and criminal-wanted lists.

If desired, in order to help avoid implications with the FCRA, an embodiment can prevent data from including identifiers that would assure the subscriber that the subject of the data is the same person as the subject of the subscriber's inquiry. For example, while the data will typically identify the subject by name, they often will not include a social security number, photograph, postal address, or similar comparatively definitive identification. As many people share identical names, a subscriber often will be unsure whether any or all of the data received relate to the person inquired about.

Figure 2:
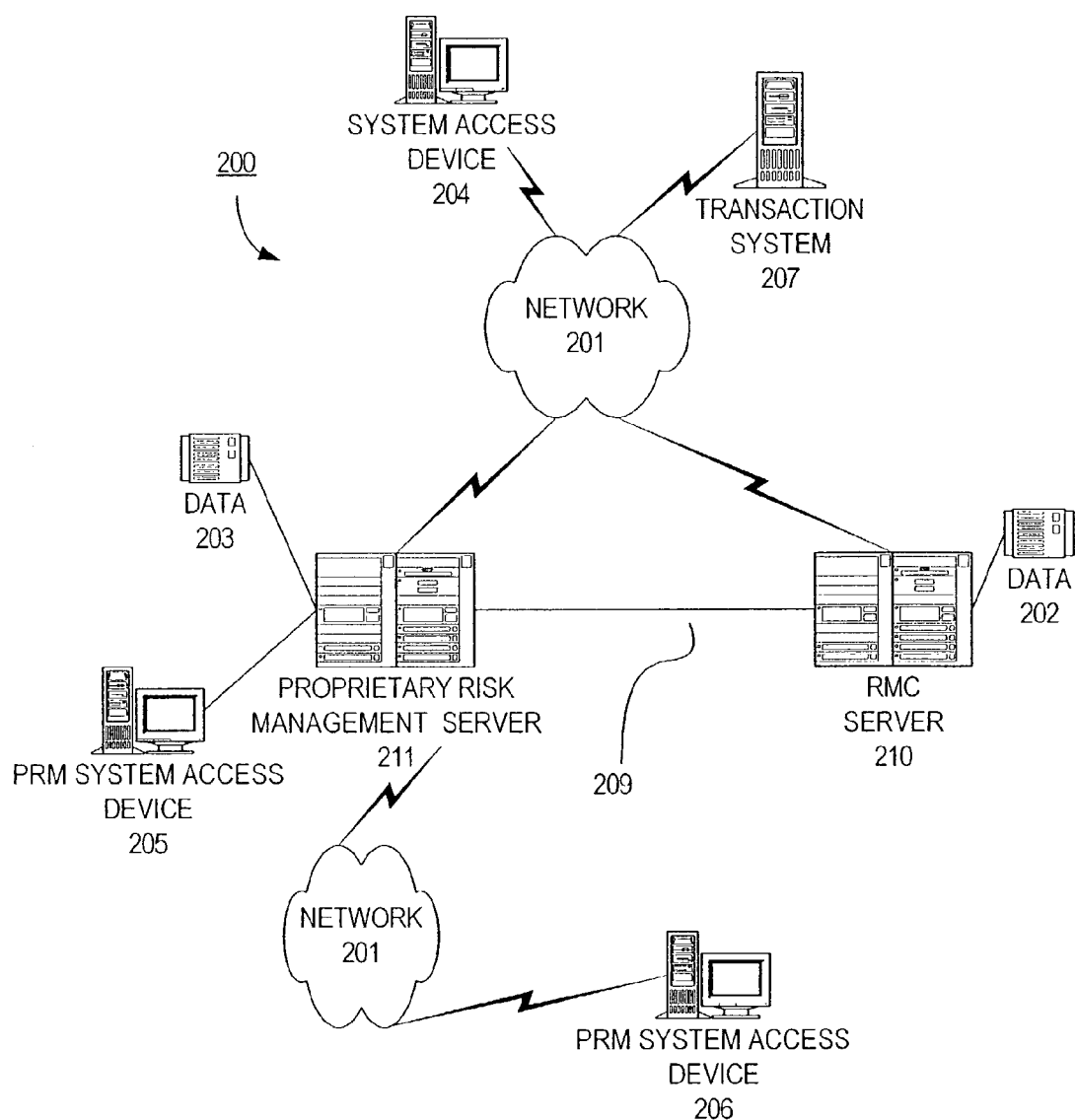
FIG. 2 illustrates a network of computer systems that can embody an automated Hedge Fund risk management system.

Referring now to FIG. 2, a network diagram illustrating one embodiment of the present invention is shown 200. An automated RMC 106 can include a computerized RMC server 210 accessible via a distributed network 201 such as the Internet, or a private network. A Subscriber 111 or other party interested in Hedge Fund risk management, can use a computerized system or network access device 204-207 to receive, input, transmit or view information processed in the RMC server 210. A protocol, such as the transmission control protocol internet protocol (TCP/IP) can be utilized to provide consistency and reliability.

In addition, a PRMC server 211 can access the RMC server 210 via the network 201 or via a direct link 209, such as a T1 line or other high speed pipe. The RMC server 210 can in turn be accessed by a Subscriber 111 via a system access device 204-207 and a distributed network 201, such as a local area network, or other private network, or even the Internet, if desired. A Subscriber 111 can also be situated to access the RMC server 210 directly, or any other system architecture conducive to a particular need or situation. In some embodiments, a remote Subscriber 111 can access the RMC server 210 via a system access device 204-207 also used to access other services, such as resources available on the Internet.

A computerized system or system access device 204-207 used to access the RMC server 210 or the PRM server 211 can include a processor, memory and a Subscriber 111 input device, such as a keyboard and/or mouse, and a Subscriber 111 output device, such as a display screen and/or printer. The system access devices 204-207 can communicate with the RMC server 210 or the PRM server 211 to access data and programs stored at the respective servers 210-211. The system access device 204-207 may interact with one or more servers 210-211 as if the servers 210-211 were a single entity in the network 200. However, the servers 210-211 may include multiple processing and database sub-systems, such as cooperative or redundant processing and/or database servers that can be geographically dispersed throughout the network 200.

The PRM server 211 and the RMC server 210 include one or more databases 202-203 storing data relating to proprietary risk management. The PRM server 211 and the RMC server 210 may interact with and/or gather data from an operator of a system access device 204-207 or other source. Data received may be structured according to risk variables and utilized to calculate a risk quotient.

Typically a Subscriber 111, will access the PRM server 211 or RMC server 210 using client software executed at a system access device 204-207. The client software may include a generic hypertext markup language (HTML) browser, such as Netscape Navigator or Microsoft Internet Explorer, (a "WEB browser"). The client software may also be a proprietary browser, and/or other host access software. In some cases, an executable program, such as a Java™ program, may be downloaded from a server 210-211 to the client computer and executed at the system access device or computer as part of the RMC risk management software. Other implementations include proprietary software installed from a computer readable medium, such as a CD ROM. The invention may therefore be implemented in digital electronic circuitry, computer hardware, firmware, software, or in combinations of the above. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output.

Figure 3:
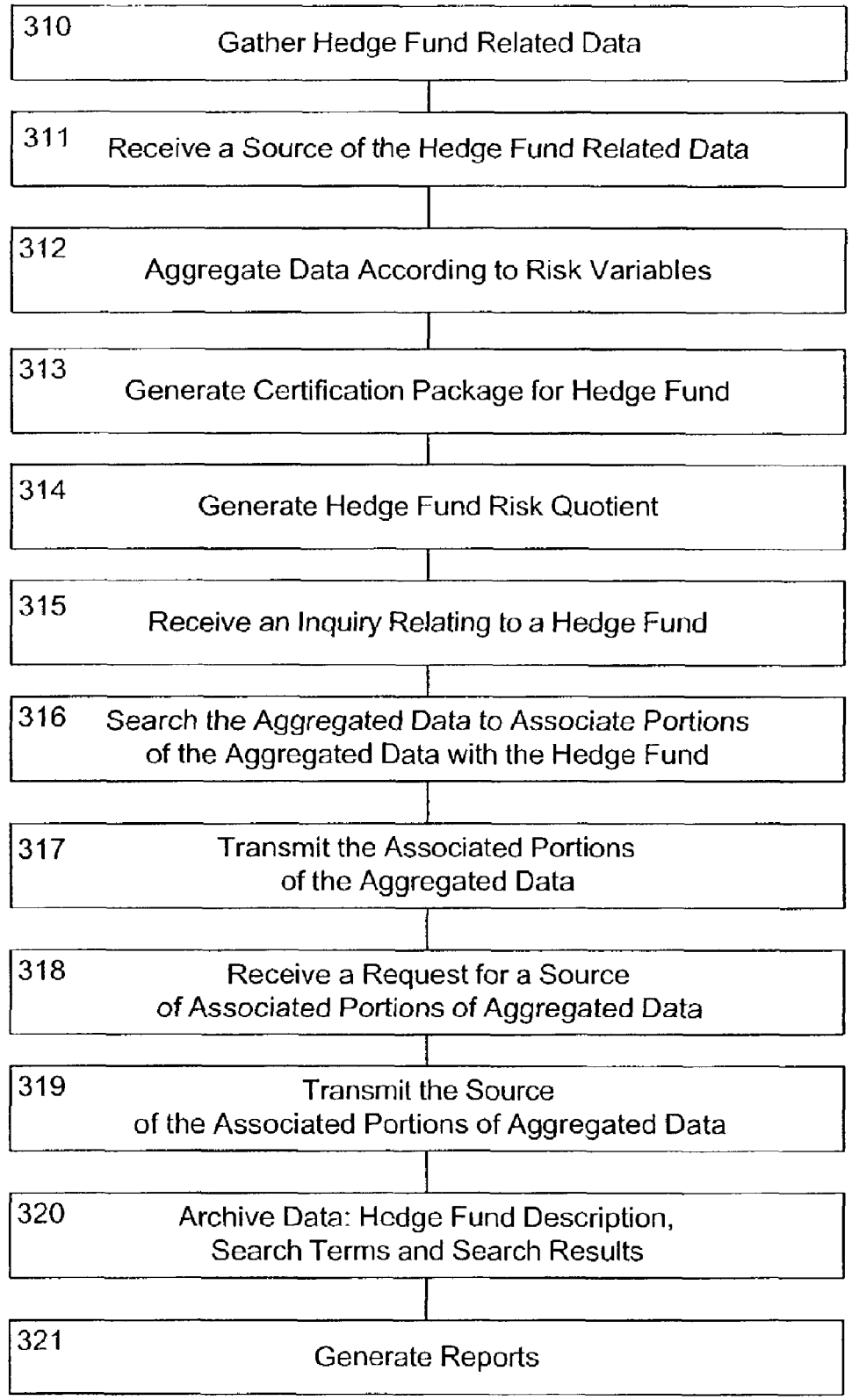
FIG. 3 illustrates a flow of exemplary steps that can be executed by a system implementing the present invention.

Referring now to FIG. 3, exemplary steps taken to manage risk associated with a Hedge Fund can include gathering data relating to risk the Hedge Fund 310 and receiving the gathered information into a PRM server 211 or RMC server 210. Informational data can be gathered from an employee of the Hedge Fund, from a source of electronic data such as an external database, messaging system, news feed, government agency, from any other automated data provider, from a party to a transaction, or other source. Information can be received on an ongoing basis such that if new events occur in the world that relate to a specified Hedge Fund, the information can be included in a risk calculation.

In addition to the information itself, a source of risk variable data can also be received 311 by the RMC server. For example, a source of risk variable data may include a private investigator, a government agency, an investigation firm, public records, news reports, publications issued by Treasury's Financial Crimes Enforcement Network ("FinCEN"), the State Department, the CIA, the General Accounting Office, Congress, the Financial Action Task Force ("FATF"), various international financial institutions (such as the World Bank and the International Monetary Fund), the United Nations, other government and non-government organizations, internet websites, news feeds, commercial databases, or other information sources.

The PRM server 211 or RMC server 210 can aggregate the data received according to risk variables 312 or according to another data structure which is conducive to fielding risk related to Hedge Funds.

A RMC server 210 can be accessed in real time, or on a transaction by transaction basis. In a real time embodiment, any changes to the RMC data 108 may be automatically forwarded to a system access device 204-207 or an in-house PRM system 112. On a transaction by transaction basis, the PRM system 112 can be queried for specific data that relates to variables associated with a particular transaction.

All data received can be combined and aggregated 312 according to risk variables to create an aggregate source of data which can be accessed to perform risk management activities. Combining data can be accomplished by any known data manipulation method. For example, the data can be maintained in separate tables and linked with relational linkages, or the data can be gathered into on comprehensive table or other data structure. In addition, if desired, information received can be associated with one or more variables including a position held by a sponsor or Hedge Fund partner, a country in which the fund is domiciled, how long a fund has been operating, the amount of leverage on the Hedge Fund's assets, the veracity of previous dealings with persons associated with the Hedge Fund, the propensity of people associated with the Hedge Fund to execute unlawful or unethical transactions, a type of transaction that will involve the Hedge Fund, or other criteria.

In some embodiments, a certification package can be created relating to a particular Hedge Fund 313. A certification package can include a list of parameters for which an inquiry was executed. For example, parameters can include all principals involved in a Hedge Fund. The parameters can be researched and the results included in a certification package. In addition, research into any suspect practices or associations can also be conducted. A certification package can be standardized or subjective to a particular fund. The list of subjects researched can serve as an indicator of how comprehensive the research is that is being performed.

If desired, different levels of certification can also be made available. For example a Level A certification may include high level research and Levels B, C, and D may include increasingly more detailed research and a more comprehensive list of researched parameters. Other examples of Hedge Fund related parameters that can be part of one or another certification level can include: a sponsor of a Hedge Fund, a partner of a Hedge Fund, a domicile of a Hedge Fund, an investment of a Hedge Fund or investors in a Hedge Fund where applicable.

Still other embodiments can include generating a risk quotient for a Hedge Fund based upon the certification research and weighted risk variables 314. Generation of a risk quotient may have legal implications pertaining to the FCRA or statutes regarding the sharing of information. Accordingly, a Hedge Fund risk quotient may be more suitably generated on an in-house PRM system 112. However, a RDC system 106 can be made capable of generating such a rating which can provide a ready Risk reference for a subscriber 111.

The RMC server 210 or PRM server 211 can receive an inquiry relating to a Hedge Fund 315. The inquiry from a subscriber 111, or other authorized entity, can cause the respective servers 210-211 to search the aggregated data and associate related portions of aggregated data with Hedge Fund 316. The associated portions of aggregated data can be transmitted 317 to a destination designated by the inquiry requestor, such as a system access device 204-207 or a PRM system 112, a fax machine or a voice line.

The RMC server 210 may also receive a request for the source of any associated portions of aggregated data transmitted 318, in which case, the RMC server 210 can transmit the source of the associated portions of aggregated data 319. The source may be useful in adding credibility to the data, or to follow up with a request for additional information.

The RMC server 210 can also store in memory, or otherwise archive risk management related data and proceedings 320. Archived risk management related data and proceedings can be useful to quantify corporate governance and diligent efforts to address high risk situations. Accordingly, reports quantifying RMC risk management risk management procedures, executed due diligence, corporate governance or other matters can be generated 321.

Figure 4:
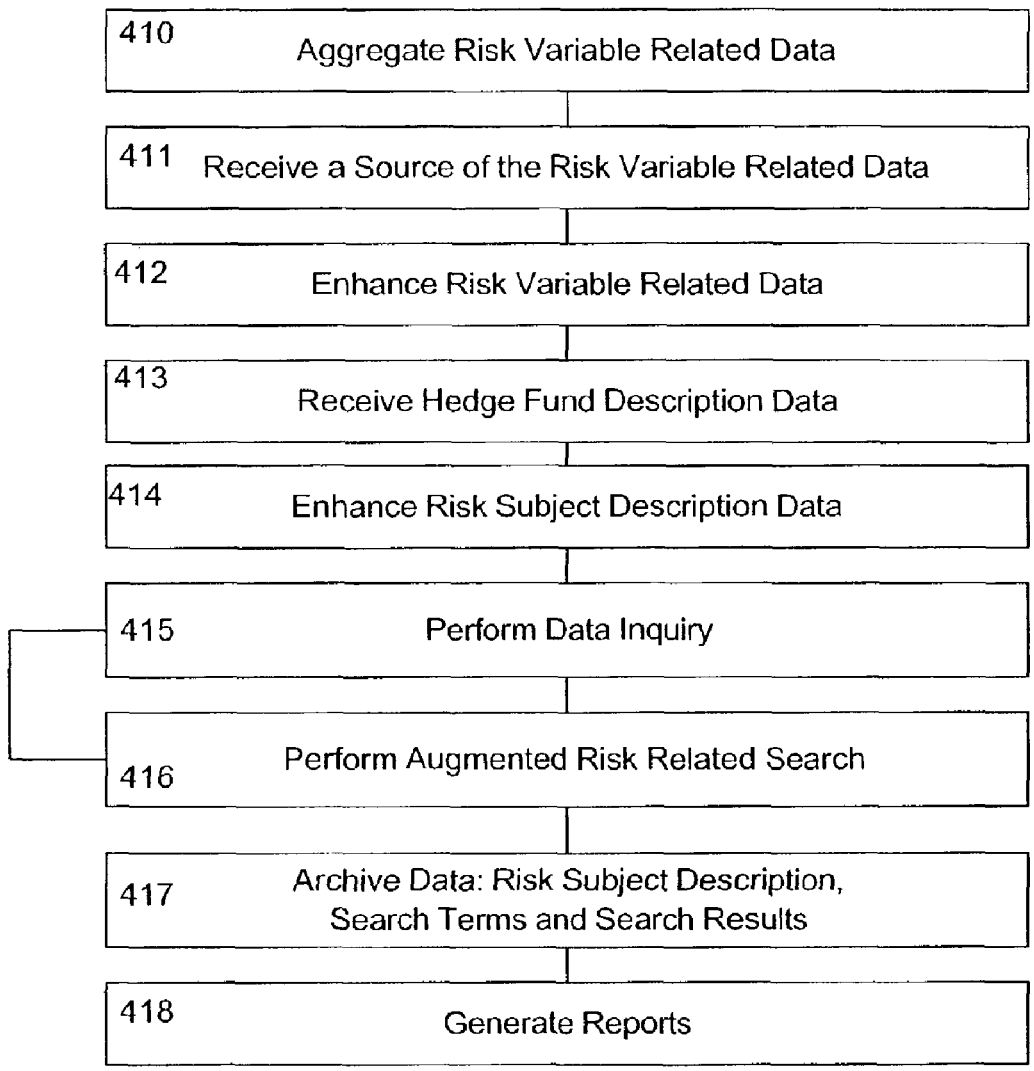
FIG. 4 illustrates a flow of exemplary steps that can be executed by a system to implement augmented data.

Referring now to FIG. 4, the present invention can also include steps that allow a RMC server 210 or PRM server 211 to provide data augmenting functionality that allows for more accurate processing of data related to risk management. Accordingly, a RMC server 210 or PRM server 211 can aggregate risk variable related data 410 and a source of the risk variable related data 411. The RMC server 210 or PRM server 211 can enhance risk variable related data, such as through data scrubbing techniques or indexing as discussed above. A Hedge Fund description can also be received 413 and scrubbed or otherwise enhanced 414.

An inquiry can be performed against the aggregated and enhanced data 415. In addition, an augmented search that incorporates data mining techniques 416 can also be included to further expand the depth of knowledge retrieved by the inquiry. If desired, a new inquiry can be formed as a result of the augmented search. This process can continue until the inquiry and augmentation ceases to add any additional meaningful value.

As discussed above, any searching and augmentation can be archived 417 and reports generated to quantify the due diligence efforts 418.

Figure 5:
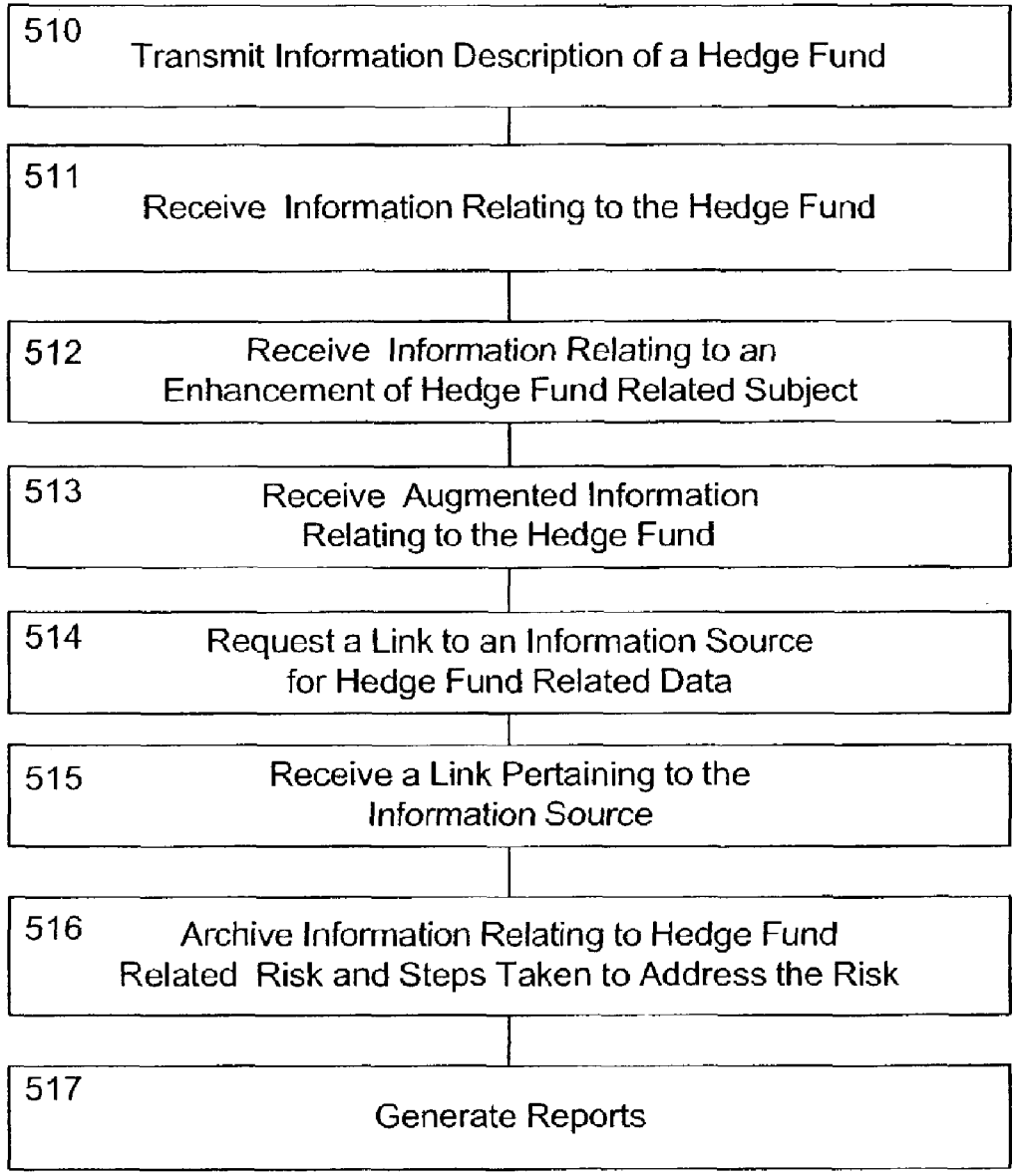
FIG. 5 illustrates a flow of exemplary steps that can taken by a user of the Hedge Fund risk management system.

Referring now to FIG. 5, a flow chart illustrates steps that a Subscriber 111, such as a financial institution, can implement to manage risk associated with a Hedge Fund. The Subscriber 111 can receive information descriptive of a Hedge Fund, such as an entity associated with the Hedge Fund 510. This information may be received during the normal course of business, such as when a details of a transaction are ascertained and it is discovered that the transaction will involve a Hedge Fund. The Subscriber 111 can access a RMC server 210 or PRM server 211 and identify to the server 210-211 one or more entities, partners, sponsors, managers, or other risk variables involved with the Hedge Fund 511.

Access can be accomplished, for example, by opening a dialogue with a RMC system 211 with a network access device, 204-207, 204-207. Typically, the dialogue would be opened by presenting a GUI to a network access device accessible by a person or an electronic feed that will enter information relating to the transactor. The GUI will be capable of accepting data input via a network access device. An example of a GUI would include a series of questions relating to a transaction. Alternatively, information can be received directly into fields of a database, such as from a commercial data source. Questions can be fielded during a transaction, or at any other opportunity to gather information.

In some embodiments, automated monitoring software can run in the background of a normal transaction program and screen data traversing an application. The screened data can be processed to determine key words wherein the key words can in turn be presented to the RMC server 210 as risk subjects or risk variables. The RMC server 210 will process the key words to identify entities or other risk variables. Monitoring software can also be installed to screen data traversing a network or communications link.

The Subscriber 111 will receive back information relating to risk associated with conducting a transaction involving the submitted subject 512. The information can include enhanced data, such as scrubbed data. In some embodiments, a Subscriber 111 can receive ongoing monitoring of key words, identified entities, a geographic location, or other subject, or list of subjects. Any updated information or change of status detected via an ongoing monitoring can result in an alarm or other alert being sent to one or more appropriate Subscriber 111s.

The Subscriber 111 can also receive augmented information 513, such as data that has been processed through data mining techniques discussed above.

In addition to receiving augmented information 513, a Subscriber 111 can request an identifier, such as a link to a source of information relating to a Hedge Fund 514. Receipt of a link pertaining to a source of information 515 may be useful to pursue more details relating to the information, or may be utilized to help determine the credibility of the information received.

A Subscriber 111 can also cause an archive to be created relating to Hedge Fund related risk management 516. An archive may include, for example, information received relating to risk associated with a Hedge Fund, inquiries made concerning the Hedge Fund and any results received relating to an inquiry. In addition, the Subscriber 111 can cause a RMC server 210 to generate reports to quantify the archived information and otherwise document diligent actions taken relating to risk management 517.

A number of embodiments of the present invention have been described. Nevertheless, it will be understood that various modifications may be made without departing from the spirit and scope of the invention. For example, a Hedge Fund can voluntarily provide information to a RMC 106 in order to establish credentials that can be passed along to any subscriber placing an inquiry related to the Hedge Fund. In addition, an investigation firm, auditing firm or other information provider can also voluntarily provide information to a RMC 106 which can bolster the image of the information provider and also aid the subscriber 111. Accordingly, other embodiments are within the scope of the following claims.

What is claimed is:

1. A computer-implemented method for managing risk associated with a Hedge Fund, the method comprising:
    gathering, by a computer, data relevant to the Hedge Fund from multiple sources;
    aggregating, by the computer, the gathered data according to risk variables;
    receiving, via an interface of the computer, an inquiry relating to the Hedge Fund;
    iteratively performing the inquiry on the aggregated data and performing augmented searches until an incremental difference between successive results of performing the inquiry satisfies a criterion, wherein data resulting from each augmented search is added to the aggregated data;
    associating, by the computer, portions of the aggregated data with the Hedge Fund; and
    transmitting the portions of the aggregated data associated with the Hedge Fund from the interface in response to the inquiry.

2. The method of claim 1 wherein the gathered data is gathered exclusively from publicly available sources.

3. The method of claim 1 wherein the inquiry comprises a sponsor of the Hedge Fund.

4. The method of claim 1 wherein the inquiry comprises a partner of the Hedge Fund.

5. The method of claim 1 wherein the inquiry comprises a domicile of the Hedge Fund.

6. The method of claim 1 wherein the inquiry comprises investments made by the Hedge Fund.

7. The method of claim 1 wherein the inquiry comprises a commodity pool operator as defined in the Commodity Exchange Act.

8. The method of claim 1 wherein transmitting the associated portions of the aggregated data is conditioned upon receipt of a contractual obligation not to use the associated portions of the aggregated data for any purpose covered by the Fair Credit Reporting Act.

9. The method of claim 1 wherein the inquiry relates to Hedge Fund window dressing.

10. The method of claim 1 wherein the associated portions of the aggregated data are transmitted exclusively to an institution, such that neither an owner of the computer nor an operator of the computer will have customers or consumers as defined in the Gramm-Leach-Bliley Act.

11. The method of claim 1 wherein transmitting the associated portions of the aggregated data is conditioned upon receipt of a contractual obligation to limit use of the aggregated data for complying with regulatory and legal obligations associated with at least one of: (i) detection and prevention of money laundering, (ii) fraud, (iii) corrupt practices, (iv) organized crime, and (v) activities subject to government sanctions or embargoes.

12. The method of claim 1 wherein transmitting the associated portions of the aggregated data is conditioned upon receipt of a contractual obligation to limit use of the aggregated data for at least one of: (i) prevention or detection of a crime, (ii) apprehension or prosecution of offenders, and (iii) assessment or collection of a tax or duty.

13. The method of claim 1 wherein the inquiry relates to Hedge Fund portfolio pumping.

14. The method of claim 1 wherein the gathered data relevant to the Hedge Fund accurately reports on or consists of a governmental record.

15. The method of claim 1 additionally comprising insuring that the one or more of the multiple sources of gathered data is reputable.

16. The method of claim 1 wherein the inquiry is related to a lockup provision.

17. The method of claim 1 wherein the inquiry comprises an alert list.

18. The method of claim 1 additionally comprising continually monitoring the aggregated data and transmitting any new information related to the Hedge Fund.

19. The method of claim 1 additionally comprising enhancing the gathered data before aggregating the gathered data.

20. The method of claim 1 additionally comprising enhancing the aggregated data.

21. The method of claim 20 wherein enhancing the aggregated data comprises scrubbing the aggregated data to incorporate changes in spelling of datum.

22. The method of claim 20 wherein enhancing the aggregated data comprises utilization of an index file.

23. The method of claim 1 wherein the augmented searches comprise data mining.

24. The method of claim 1 wherein associating portions of the aggregated data comprises using Boolean logic.

25. The method of claim 1 wherein associating portions of the aggregated data comprises relevance ranking.

26. The method of claim 1 additionally comprising transmitting identities of one or more of the multiple sources that are associated with the portions of the aggregated data.

27. A computerized system for managing risk, the system comprising:
   a computer server accessible with a system access device via a communications network; and
   executable software stored on the computer server and executable on demand, the software operative with the computer server to cause the system to:
      gather data relevant to a Hedge Fund from multiple sources;
      aggregate the gathered data according to risk variables;
      receive an inquiry relating to the Hedge Fund;
      iteratively perform the inquiry on the aggregated data and perform augmented searches until an incremental difference between successive results of performing the inquiry satisfies a criterion, wherein data resulting from each augmented search is added to the aggregated data;
      associate portions of the aggregated data with the Hedge Fund; and
      transmit the portions of the aggregated data associated with the Hedge Fund in response to the inquiry.

28. The computerized system of claim 27 wherein the gathered data is gathered via an electronic feed.

29. Computer executable program code residing on a non-transitory computer-readable medium, the program code comprising instructions for causing a computer to:
   gather data related to a Hedge Fund from publicly available sources;
   aggregate the gathered data according to risk variables;
   receive an inquiry relating to a risk subject;
   iteratively perform the inquiry on the aggregated data and perform augmented searches until an incremental difference between successive results of performing the inquiry satisfies a criterion, wherein data resulting from each augmented search is added to the aggregated data;
   associate portions of the aggregated data with the risk subject; and
   transmit the associated portions of the aggregated data.

30. The computer executable program code of claim 29 wherein the computer instructions further cause the computer to:
   perform a certification inquiry relating to the Hedge Fund;
   associate portions of the aggregated data with certification parameters related to the Hedge Fund and the certification inquiry;
   transmit the certification parameters; and
   transmit the portions of the aggregated data associated with the certification parameters.

31. The computer executable program code of claim 29 wherein the computer instructions further cause the computer to generate a risk quotient relating to the Hedge Fund.

* * * * *